United States Patent
Tabbita et al.

(10) Patent No.: US 7,181,843 B1
(45) Date of Patent: Feb. 27, 2007

(54) METHOD OF MANUFACTURING A BRUSH SEAL

(75) Inventors: Martin G. Tabbita, West Palm Beach, FL (US); Kenneth D. Moore, West Palm Beach, FL (US); James T. Beals, West Hartford, CT (US); Vincent C. Nardone, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 08/535,501

(22) Filed: Sep. 28, 1995

(51) Int. Cl.
  *B21D 53/84* (2006.01)
  *A46D 1/00* (2006.01)
(52) U.S. Cl. ......................... 29/888.3; 156/72
(58) Field of Classification Search ................... 277/53; 29/888.3; 156/72, 173, 174, 175, 155, 297, 156/300, 265; 300/5, 21
  See application file for complete search history.

(56) References Cited

U.S. PATENT DOCUMENTS

| | | | |
|---|---|---|---|
| 3,839,114 A * | 10/1974 | Schmidt et al. ............. | 156/435 |
| 3,947,306 A * | 3/1976 | Haemer ....................... | 156/174 |
| 4,015,036 A * | 3/1977 | Haemer ....................... | 156/174 |
| 4,274,575 A | 6/1981 | Flower ........................ | 228/160 |
| 4,358,120 A | 11/1982 | Moore ......................... | 277/192 |
| 4,756,536 A * | 7/1988 | Belcher ....................... | 277/53 |
| 4,809,990 A | 3/1989 | Merz ............................ | 277/53 |
| 5,090,710 A | 2/1992 | Flower ........................ | 277/53 |
| 5,106,104 A * | 4/1992 | Atkinson et al. ............. | 277/53 |
| 5,135,237 A | 8/1992 | Flower ........................ | 277/53 |
| 5,183,197 A | 2/1993 | Howe .......................... | 228/160 |
| 5,201,530 A * | 4/1993 | Kelch et al. .................. | 277/53 |
| 5,308,088 A | 5/1994 | Atkinson et al. ............. | 277/53 |
| 5,335,920 A * | 8/1994 | Tseng et al. .................. | 277/53 |
| 5,351,971 A | 10/1994 | Short ........................... | 277/53 |
| 5,496,045 A * | 3/1996 | Millener et al. ............. | 277/53 |

FOREIGN PATENT DOCUMENTS

EP 453-315 A 10/1991

\* cited by examiner

*Primary Examiner*—David P. Bryant
*Assistant Examiner*—Christopher M. Koehler

(57) ABSTRACT

A method for manufacturing a brush seal is provided including the steps of: (a) providing fiber; (b) providing a packing material; (c) providing a pair of backing plates; (d) arranging the fiber in a particular arrangement; (e) applying the packing material to selective areas of the arranged fiber; (f) cutting the fibers in bristle sections, wherein each of the bristle sections includes a plurality of bristles and one of the selective areas having applied packing material; (g) stacking the bristle sections, such that the selective areas of applied packing material are aligned between the backing plates; and (h) bonding the backing plates, the bristle sections, and the packing material together.

7 Claims, 1 Drawing Sheet

METHOD OF MANUFACTURING A BRUSH SEAL

BACKGROUND OF THE INVENTION

1. Technical Field

This invention pertains to gas or liquid seals in general, and to brush seals in particular.

2. Background Information

Brush seals, consisting of a plurality of bristles sandwiched between a pair of backing plates, are a known means for sealing between a stationary element and a rotating element. The seal backing plates are attached to one of the stationary or rotating element and the bristles extend outwardly toward the other of the stationary or rotating element. The bristles are typically arranged in parallel rows with one end of the bristles captured between the backing plates and the other end extending outwardly. In some cases, the backing plates are centered on the bristles, and the ends of the bristles extend outwardly in opposite directions. The bristles extending between the two elements inhibit or prevent gas/fluid flow between the two elements.

The packing arrangement of the bristles, and their orientation between the elements determine some of the sealing characteristics of the seal. For example, bristles of varying stiffness can be used in the same seal to decrease the leakage rate through the seal; e.g., larger diameter bristles can be dispersed amongst smaller diameter bristles. The larger diameter bristles increase the aggregate bristle stiffness, and the intermingled smaller diameter bristles "fill in" the area between the larger bristles and minimize or prevent leakage. Bristles may also be skewed from one surface to accommodate disparate growth between the two surfaces. Skewing the bristles sometimes allows bristles to elastically deflect, rather than plastically deform, as one surface draws near the other.

Brush seals within gas turbine engines are most often manufactured from metallic bristles and backing plates. Metallic bristles are attractive because they provide a relatively effective seal in a cost effective manner that can be used in moderately high temperature environments. There are applications, however, where physical limitations make metallic bristles brush seals a less attractive option. Specifically, in applications where weight is a concern, it may be a disadvantage to implement a metallic seal. In other applications, metallic bristles may be susceptible to excessive wear. In still other applications, the temperature environment may be above that allowable for metallic bristles. In those instances, it may be advantageous to implement brush seals having ceramic, or ceramic like, bristles.

The methods used for manufacturing most metallic brush seals generally cannot be used for manufacturing ceramic brush seals, however. The bristles and backing plates of metallic brush seals are commonly joined by a bead of weld drawn between the backing plates. Ceramic type bristles, conversely, cannot be joined by a welding process. What is needed, therefore, is a practical and cost effective method of manufacturing ceramic, or ceramic like, bristle brush seals.

DISCLOSURE OF THE INVENTION

An object of the present invention is to provide a method for manufacturing a brush seal capable of use in a high temperature environment.

Another object of the present invention is to provide a method for manufacturing brush seals having bristles comprised of ceramic, or ceramic like, fibers.

According to the present invention, a method for manufacturing a brush seal is provided including the steps of: (a) providing fiber; (b) providing a packing material; (c) providing a pair of backing plates; (d) arranging the fiber in a particular arrangement; (e) applying the packing material to selective areas of the arranged fiber; (f) cutting the fibers in bristle sections, wherein each of the bristle sections includes a plurality of bristles and one of the selective areas having applied packing material; (g) stacking the bristle sections, such that the selective areas of applied packing material are aligned between the backing plates; and (h) bonding the backing plates, the bristle sections, and the packing material together.

An advantage of the present invention is that a method for manufacturing a brush seal that can withstand high temperatures is provided. As gas turbine engine performance and efficiency rise, so does the temperature of the core gas flow passing through the engine. Providing seals that can accommodate the elevated temperatures is a distinct advantage.

A further advantage of the present invention is that a method for manufacturing a brush seal having ceramic, or ceramic like, bristles is provided. Brush seals having ceramic type bristles require different manufacturing steps than those required for metallic brush seals. Accordingly, it is an advantage to provide a simple cost-effective method for assembling brush seals having ceramic type bristles.

A still further advantage of the present invention is that a method for producing a lightweight bristle seal is provided. Using a ceramic or ceramic like fiber, a polymer packing material, and reinforced polymer backing plates decreases the weight of the seal relative to most metallic brush seals of similar dimensions.

A still further advantage of the present invention is that a method for producing a bristle seal having increased wear resistance is provided. The ceramic or ceramic like fibers of the present invention are more wear resistant than many metallic brush seals.

These and other objects, features and advantages of the present invention will become apparent in light of the detailed description of the best mode embodiment thereof, as illustrated in the accompanying drawings.

BEST MODE FOR CARRYING OUT THE INVENTION

Figure 1:
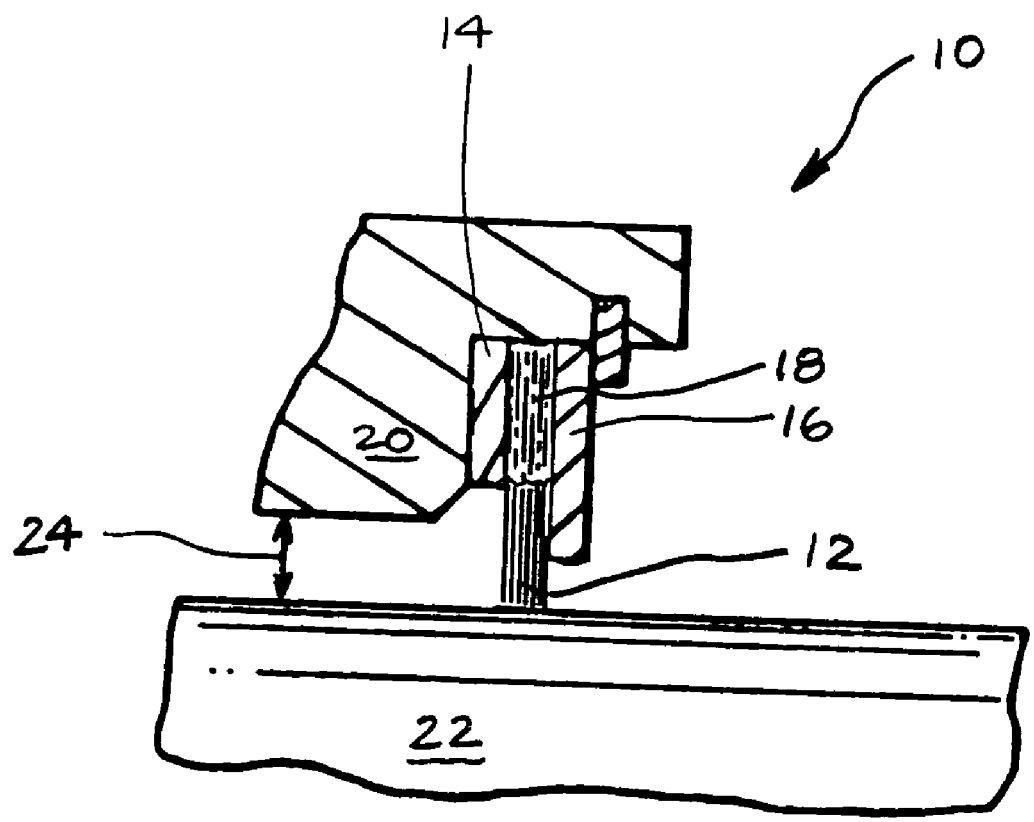
FIG. 1 is a diagrammatic cross-sectional view of a brush seal attached to a first element, acting against another element.

Referring to FIG. 1, a method for manufacturing a brush seal 10 having ceramic, or ceramic like, fibers is described herein. The brush seal 10 includes a plurality of bristles 12 formed from ceramic fibers, an upstream 14 and downstream 16 backing plate, and packing material 18. In the finished form, one end of the bristles 12 and the packing material 18 are positioned between the upstream 14 and downstream 16 backing plates, which are substantially parallel one another. The packing material 18, bristles 12, and backing plates 14, 16 are bonded to one another to form the brush seal 10. The brush seal 10 is attached to a first element 20 and extends outwardly toward a second element 22, sealing the gap 24 therebetween.

The brush seal bristles are formed by first winding a ceramic, or a ceramic like, fiber around a cylindrical drum. Alternatively, a plurality of fibers may be biased against an arcuate form in a manner approximating a fiber wound on a drum. In both cases, the relative distribution of the fibers is selected based upon the seal characteristics of the particular seal being made; i.e., the closer the fibers are packed, the less fluid will leak through the seal, and the greater the stiffness of the seal.

After the fibers are wound on the drum, "zones" where packing material is to be applied to the fibers are defined prior to the application of packing material. For purposes of clarity, areas of the wound or otherwise arranged fibers where packing material is to be applied are referred to as applied zones. Areas where packing material should not be applied, i.e., the remaining areas of the arranged fibers, are referred to as free zones. In instances where easily confined packing materials are used that will not migrate during the bonding step, it is sufficient to denote the boundaries of the applied zones. In other instances where easily confined packing materials are used that may migrate during the bonding step, the applied zones are defined by attaching a masking agent at the border between the free zones and the applied zones. In still other instances where packing materials are used that cannot be easily confined during application (for example spray application of a packing material) or during later bonding steps, the free zones are masked to prevent bonding between the packing material and the bristles within the free zones during later steps. For example, if the backing material is best applied by spray, masking the free zones allows the applied zones to be sprayed without the adverse effects caused by overspray. Which approach is preferable depends on the packing material itself and how the packing material is applied to the intended zones.

Once the intended zones have been defined and masked if necessary, the packing material is applied and allowed to dry. The packing material, which will be described in more detail infra, binds the wound fibers together and enables them to be removed from the drum. After the packing material has dried, the fibers are cut into bristle sections. Each bristle section includes a segment of applied packing material and cut fibers (i.e., "bristles") extending out from the packing material. The bristle sections are subsequently stacked on top of one another such that the bristles from the sections align in a pattern and the packing material sections align with one another. The particular pattern chosen depends upon the seal characteristics of the brush seal being manufactured.

The next step in the manufacturing process is the bonding step where the upstream and downstream backing plates are assembled with the bristle sections and the assembly is bonded into a single piece. The bonding process for a particular seal depends upon the composition of the bristles, the packing material, and the backing plates as will be discussed infra.

The above described method for manufacturing a brush seal having ceramic type bristles will vary in detail depending upon the composition of the bristles, packing material, and backing plates. The following examples represent some, but not all, of the exact processes that may be followed under the above described method.

In a first example, fibers comprised of, but not limited to, glass, boron, carbon, silicon carbide, or aluminum oxide are used with a polymer matrix (or polymer matrix composite) packing material, and backing plates consisting of a polymer matrix similar to the used to bind the fibers together, reinforced with carbon fiber to provide stiffness. The polymer matrix may be a thermoset (high temperature epoxy) or a high temperature thermoplastic (polyimide) having a low maximum use temperature (350 to 500° F.) and a very low density (<0.05 lbs/in$^3$). A suitable thermoset, for example, would be SCOTCHPLY PR500™ which is marketed by Minnesota Mining and Manufacturing. Suitable thermoplastics include AVIMID N™ marketed by E.I. Du Pont de Nemours & Co.

After the packing material has dried, the wound fibers can be cut into appropriate sized bristle sections and removed from the drum. The sections are then stacked between the backing plates. The curing or densification step in which the bristles and the backing plate bond to one another varies depending upon the polymer matrix or matrix composite chosen. When the fibers are made from a silicon carbide monofilament, for example, and the packing material includes AVIMID™ thermoplastic, and the backing material consists of AVIMID™ thermoplastic reinforced with carbon fiber, then the elements may be formed into a solid part by heating the seal to approximately 275° F. for a period of two (2) hours at a pressure of approximately 3000 psi, and subsequently heating the seal to approximately 750° F. for a period of one (1) hour at the same pressure.

In a second embodiment, fibers comprising, but not limited to, boron, silicon carbide or aluminum oxide, are used with a packing material in the form of a slurry, and metallic backing plates. The slurry consists of a fugitive organic binder, solvent or water, and fine metal powder (−325 mesh). A suitable fugitive organic binder is RHOPLEX™ marketed by the Rohm and Haas Company. The type of metal chosen for the backing plates must be compatible with the fiber type at processing and operating temperature. For example, boron (or SiC coated boron) and silicon carbide fibers may be used with aluminum and titanium alloys, and aluminum oxide fibers maybe used with aluminum and many superalloys. Some combinations of metal and fiber (for example silicon carbide fiber and nickel based alloys) may detrimentally react at processing and use temperatures and therefore must be avoided. To form the bristle sections, the zones where slurry is to be applied to the wound fiber are defined and masked. For this example, a release agent containing boron nitride may be used for masking purposes. After the slurry has dried, bristle sections are cut and stacked to the desired geometry and thickness. The metal backing plates are subsequently added to the stacked bristle sections and the assembly is first heated to remove the fugitive binder, and second vacuum hot pressed to consolidate the assembly. Typical consolidation conditions for a seal having fiber bristle sections made from SAPHIKON™, backing plates made from HAYNES 230™, and a slurry including RHOPLEX™, would be pressing at approximately 7,000 psi at 2100° F. for 1 hour. HAYNES 230™ is a nickel based super alloy marketed by Haynes International, Inc. and SAPHIKON™ is an aluminum oxide ceramic fiber marketed by Saphikon Incorporated.

In a third example, fibers consisting of, but not limited to, aluminum oxide or silicon carbide, may be used with a ceramic or ceramic matrix composite backing plate. Typical ceramic matrices that may be used for the backing plates include glass or glass matrix composites, aluminum oxide, or silicon carbide and silicon carbide composites. In a process similar to that disclosed in the second example, a slurry containing a fugitive binder and glass or ceramic powder is applied to the intended zones of the wound fiber. After the slurry dries, the bristle sections are cut, removed from the drum, and positioned between ceramic or ceramic composite backing plates. The seal is subsequently consolidated into a solid assembly by subjecting the seal to an elevated temperature and pressure for a period of time. For example, typical consolidation conditions for a seal having backing plates consisting of barium magnesium aluminum silicate (BMAS) glass and bristle sections consisting of aluminum oxide fibers are approximately 500 psi at 1430° C. for 5 mins.

Although this invention has been shown and described with respect to the detailed embodiments thereof, it will be understood by those skilled in the art that various changes in form and detail thereof may be made without departing from the spirit and the scope of the invention.

We claim:

1. A method for manufacturing a brush seal, comprising the steps of:
   providing fiber;
   providing a pair of backing plates;
   arranging said fiber in a particular arrangement;
   selectively applying a packing material to said arranged fiber, wherein said packing material binds said arranged fiber together;
   cutting said fiber in bristle sections, wherein each said bristle section includes a plurality of bristles and an area of applied packing material;
   stacking said bristle sections, such that said areas of applied packing material are aligned between said backing plates; and
   bonding said backing plates, said bristle sections, and said packing material together;
   wherein said packing material includes a fugitive binder, said fugitive binder binding said fibers together prior to said bonding step, and wherein said fugitive binder is released from said packing material during said bonding step, and is removed from said brush seal.

2. A method for manufacturing a brush seal according to claim 1, further comprising the step of:
   masking said arranged fiber before said packing material is applied to limit said application of said packing material to select areas of said arranged fiber.

3. A method for manufacturing a brush seal according to claim 1, wherein:
   said fiber comprising one of boron, silicon carbide, aluminum oxide, or combinations thereof; and
   said packing material comprising a fugitive organic binder and a metal powder; and
   said backing plates comprising metal.

4. A method for manufacturing a brush seal according to claim 1, wherein:
   said fiber comprising one of silicon carbide, aluminum oxide, or a combination thereof; and
   said packing material comprising a fugitive organic binder, and a ceramic or a ceramic matrix; and
   said backing plates comprising a ceramic or a ceramic matrix.

5. A method for manufacturing a brush seal, comprising the steps of:
   providing fiber, comprising one of glass, boron, carbon, silicon carbide, aluminum oxide, or combinations thereof;
   providing a pair of backing plates, said backing plates comprising polymer matrix;
   arranging said fiber in a particular arrangement;
   selectively applying a packing material to said arranged fiber, wherein said packing material comprises a polymer matrix reinforced with a carbon fiber, wherein said packing material binds said arranged fiber together;
   cutting said fiber in bristle sections, wherein each said bristle section includes a plurality of bristles and an area of applied packing material;
   stacking said bristle sections, such that said areas of applied packing material are aligned between said backing plates;
   bonding said backing plates, said bristle sections, and said packing material together.

6. A method for manufacturing a brush seal, comprising the steps of:
   providing fiber, comprising one of boron, silicon carbide, aluminum oxide, or combinations thereof;
   providing a pair of backing plates, comprising metal;
   arranging said fiber in a particular arrangement;
   selectively applying a packing material to said arranged fiber, wherein said packing material comprises a fugitive organic binder and a metal, wherein said packing material binds said arranged fiber together;
   cutting said fiber in bristle sections, wherein each said bristle section includes a plurality of bristles and an area of applied packing material;
   stacking said bristle sections, such that said areas of applied packing material are aligned between said backing plates;
   bonding said backing plates, said bristle sections, and said packing material together.

7. A method for manufacturing a brush seal, comprising the steps of:
   providing fiber, comprising one of silicon carbide, aluminum oxide, or combinations thereof;
   providing a pair of backing plates, comprising a ceramic or a ceramic matrix;
   arranging said fiber in a particular arrangement;
   selectively applying a packing material to said arranged fiber, wherein said packing material comprises a fugitive organic binder and a ceramic or a ceramic matrix, wherein said packing material binds said arranged fiber together;
   cutting said fiber in bristle sections, wherein each said bristle section includes a plurality of bristles and an area of applied packing material;
   stacking said bristle sections, such that said areas of applied packing material are aligned between said backing plates;
   bonding said backing plates, said bristle sections, and said packing material together.

* * * * *